United States Patent
Fujita et al.

(10) Patent No.: US 11,841,500 B2
(45) Date of Patent: Dec. 12, 2023

(54) CLEANING TOOL WITH ATTACHMENT, ATTACHMENT, AND CLEANING TOOL

(71) Applicant: Fujikura Ltd., Tokyo (JP)

(72) Inventors: Shunsuke Fujita, Chiba (JP); Junichi Nakane, Chiba (JP); Kunihiko Fujiwara, Chiba (JP)

(73) Assignee: Fujikura Ltd., Tokyo (JP)

( * ) Notice: Subject to any disclaimer, the term of this patent is extended or adjusted under 35 U.S.C. 154(b) by 268 days.

(21) Appl. No.: 17/423,976

(22) PCT Filed: Mar. 31, 2020

(86) PCT No.: PCT/JP2020/014805
§ 371 (c)(1),
(2) Date: Jul. 19, 2021

(87) PCT Pub. No.: WO2020/250547
PCT Pub. Date: Dec. 17, 2020

(65) Prior Publication Data
US 2022/0082819 A1    Mar. 17, 2022

(30) Foreign Application Priority Data

Jun. 13, 2019   (JP) .................................. 2019-110428

(51) Int. Cl.
*G02B 27/00* (2006.01)
*B08B 1/00* (2006.01)
*G02B 6/38* (2006.01)

(52) U.S. Cl.
CPC .......... *G02B 27/0006* (2013.01); *B08B 1/006* (2013.01); *B08B 1/008* (2013.01); *B08B 2240/02* (2013.01); *G02B 6/381* (2013.01)

(58) Field of Classification Search
CPC ............... G02B 6/381; G02B 27/0006; B08B 2240/02; B08B 1/008; B08B 1/006
(Continued)

(56) References Cited

U.S. PATENT DOCUMENTS

| D681,292 S | * | 4/2013 | Fujiwara ........................ D32/35 |
| 2003/0169991 A1 | | 9/2003 | Malevanets et al. |

(Continued)

FOREIGN PATENT DOCUMENTS

| CN | 1798993 A | 7/2006 |
| CN | 102380484 A | 3/2012 |

(Continued)

OTHER PUBLICATIONS

International Search Report issued in International Application No. PCT/JP2020/014805, dated May 26, 2020 (2 pages).

*Primary Examiner* — Katina N. Henson
(74) *Attorney, Agent, or Firm* — Osha Bergman Watanabe & Burton LLP

(57) ABSTRACT

An attachment cleaning tool includes: a cleaning tool; and an attachment detachably attached to the cleaning tool. The cleaning tool includes: cleaning bodies that clean connection end surfaces of ferrules of an optical connector; head members each that press the cleaning bodies against the connection end surfaces; nozzle members that respectively accommodate the head members; a feeding mechanism that supplies and withdraws the cleaning bodies with respect to the head members; and an accommodating body which accommodates the feeding mechanism. Each of the connection members of the attachment includes: an attachment portion attached to a tip portion of each of the nozzle members; and a tubular portion that protrudes from the attachment portion in a longitudinal direction of the nozzle members and into which one of the ferrules is inserted. The connection members move following a relative movement of the nozzle members in the lateral direction.

7 Claims, 9 Drawing Sheets

(58) Field of Classification Search
USPC .......................................................... 15/210.1
See application file for complete search history.

(56) References Cited

U.S. PATENT DOCUMENTS

2010/0043159 A1    2/2010  Fujiwara
2012/0066849 A1*  3/2012  Fujiwara .............. G02B 6/3866
                                                                       15/97.1

FOREIGN PATENT DOCUMENTS

| CN | 103299225 A | 9/2013 |
| JP | 2010-164997 A | 7/2010 |
| JP | 2011-150083 A | 8/2011 |
| JP | 2011-186082 A | 9/2011 |
| JP | 5238873 B2 | 7/2013 |

* cited by examiner

CLEANING TOOL WITH ATTACHMENT, ATTACHMENT, AND CLEANING TOOL

BACKGROUND

Technical Field

The present invention relates to a cleaning tool with an attachment, an attachment, and a cleaning tool.

Priority is claimed on Japanese Patent Application No. 2019-110428, filed Jun. 13, 2019, the content of which is incorporated herein by reference.

Related Art

Patent Document 1 discloses a cleaning tool for wiping and cleaning a connection end surface of a ferrule included in an optical connector with a cleaning body. This cleaning tool includes a plurality of head members for abutting the cleaning body against the connection end surface, and a plurality of nozzle members (tip tubular portions) that each accommodates the head member. When using the cleaning tool of Patent Document 1, each nozzle member is inserted into a connector accommodating hole of an optical adapter, and a main body portion of the cleaning tool is pushed in. Accordingly, the head member protrudes from the nozzle member, and the cleaning body wrapped around the head member abuts on the connection end surface of the ferrule, and it is possible to clean the connection end surface. Further, since the nozzle members are configured to be movable closer to or away from each other, even when a pitch between the ferrules varies, it is possible to adjust a pitch of the nozzle members to the pitch between the ferrules.

Patent Document

Patent Document 1: Japanese Patent No. 5238873

When cleaning an optical connector, a connection end surface of a ferrule located inside a connector accommodating hole may be cleaned. Meanwhile, the connection end surface of the ferrule that is not located inside the connector accommodating hole and is exposed may be cleaned. In the configuration of Patent Document 1, the nozzle member and the ferrule are aligned by inserting the nozzle member into the connector accommodating hole. Therefore, when the ferrule is exposed, it is difficult to align the positions between the plurality of nozzle members movable relative to each other and the plurality of ferrules.

SUMMARY

One or more embodiments provide a cleaning tool with an attachment, an attachment, or a cleaning tool capable of aligning the positions between the plurality of exposed ferrules and the plurality of nozzle members movable relative to each other.

According to one or more embodiments, there is provided a cleaning tool with an attachment, including: a cleaning tool; and an attachment which is attach to the cleaning tool and is detachable from the cleaning tool, in which the cleaning tool includes a plurality of cleaning bodies which clean connection end surfaces of ferrules of an optical connector; a plurality of head members which respectively press the plurality of cleaning bodies against the connection end surfaces; a plurality of nozzle members which respectively accommodate the plurality of head members; a feeding mechanism which supplies and withdraws the plurality of cleaning bodies with respect to the plurality of head members; and an accommodating body which accommodates the feeding mechanism, in which the plurality of nozzle members are provided to be movable closer to each other and away from each other in a lateral direction in which the plurality of nozzle members are arranged, the attachment includes a plurality of connection members, each of the plurality of connection members includes: an attachment portion attached to a tip portion of each of the nozzle members; and a tubular portion which protrudes from the attachment portion in a longitudinal direction of the plurality of nozzle members and into which the ferrule is inserted, and the plurality of connection members move following a relative movement of the plurality of nozzle members in the lateral direction.

According to one or more embodiments, by inserting the ferrule into the tubular portion of each connection member, it is possible to align positions of the nozzle member, positions of the head member accommodated inside the nozzle member, and positions of the ferrule. Further, each connection member moves following approach and separation of the plurality of nozzle members. Therefore, it is possible to clean the connection end surfaces of the plurality of optical connectors having different pitches between the ferrules by the same cleaning tool with an attachment.

Further, when the ferrule is located in the connector accommodating hole, it is possible to align the positions of the head member and the position of the ferrule aligned by removing the attachment and inserting the nozzle member into the connector accommodating hole.

From the above, according to the cleaning tool with the attachment in one or more embodiments, it is possible to clean the connection end surface regardless of whether or not the ferrule is located inside the connector accommodating hole. Further, it is possible to save the trouble of changing the cleaning tool with the attachment by the optical connector having different pitches between the ferrules, and to perform efficient cleaning.

Here, a tip guide portion protruding toward the tubular portion may be formed at each tip portion of the plurality of nozzle members, an abutment portion on which the tip portion abuts may be formed on an inner surface of the attachment portion, and an inner tubular portion may be formed at the abutment portion, the inner tubular portion that protrudes toward the nozzle member and enters an inside of the tip guide portion to be in contact with the tip guide portion.

In this case, it is possible to align the positions between the tip portion of the nozzle member and the tubular portion easily by the tip guide portion and the inner tubular portion. Therefore, when the head member protrudes from the nozzle member, it is possible to introduce the head member into the tubular portion of the attachment smoothly.

Further, a first inclined surface that inclines so as to approach central axes of the nozzle members toward the accommodating body in the longitudinal direction may be formed on an inner surface of the tip guide portion, and a second inclined surface that inclines so as to approach the central axes toward the accommodating body in the longitudinal direction may be formed on an outer peripheral surface of the inner tubular portion.

In this case, when the attachment is attached to the cleaning tool, it is possible to bring the first inclined surface and the second inclined surface into contact with each other, and thus, it is possible to introduce the inner tubular portion into the tip guide portion more smoothly. Therefore, it is possible to align the positions between the tip portion of the nozzle member and the tubular portion of the attachment more reliably.

Further, an outer regulation surface may be formed in each of the plurality of connection members, the outer regulation surface that abuts on an outer abutment surface of each of the plurality of nozzle members facing outward in the lateral direction when the plurality of nozzle members move away from each other in the lateral direction.

In this case, when the plurality of nozzle members move relative to each other to be away from each other, it is possible to move the plurality of nozzle members following the plurality of connection members more reliably.

Further, an inner regulation portion may be formed in each of the plurality of connection members, the inner regulation portion that abuts on an inner abutment surface of each of the plurality of nozzle members facing inward in the lateral direction when the plurality of nozzle members move closer to each other in the lateral direction.

In this case, when the plurality of nozzle members move relative to each other to be closer to each other, it is possible to move the plurality of nozzle members following the plurality of connection members more reliably.

Further, the attachment may have a cap which is provided to be attachable to and detachable from the plurality of connection members, and the cap may not be press-fitted into the tubular portion in the lateral direction and may be press-fitted into the tubular portion in an orthogonal direction orthogonal to the lateral direction and the longitudinal direction.

In this case, it is possible to press-fit the cap into the tubular portion even in a state where the plurality of connection members are not completely close to each other, and thus, attachment/detachment operation of the cap is more easily performed.

Further, the plurality of connection members may include a first connection member and a second connection member, the second connection member may include: a pair of locking pieces which protrudes in the lateral direction and is disposed at an interval in an orthogonal direction orthogonal to the lateral direction and the longitudinal direction; and a pair of locking portions which protrude inward in the orthogonal direction from each of the pair of locking pieces, and the first connection member may include a pair of groove portions on which the pair of locking pieces respectively slide and a pair of locking protruding portions which are respectively locked to the pair of locking portions.

In this case, it is possible to make the first connection member and the second connection member move relative to each other, and to prevent the first connection member and the second connection member from unexpectedly falling off. Further, by elastically deforming the locking piece, it is possible to assemble the second connection member to the first connection member easily.

According to one or more embodiments, there is provided an attachment mounted on a cleaning tool for cleaning connection end surfaces of an optical connector by a cleaning body, the attachment including: a plurality of connection members which are provided to be movable closer to each other and away from each other, in which each of the plurality of connection members includes an attachment portion attached to a tip portion of a nozzle member of the cleaning tool, and a tubular portion which protrudes from the attachment portion and into which a ferrule is inserted, and the attachment is attached to the tip portion of the nozzle member and is detachable from the tip portion of the nozzle member.

According to the attachment according to one or more embodiments, it is possible to align the positions between the plurality of exposed ferrules and the plurality of nozzle members with each other by attaching the attachment to the cleaning tool including the plurality of nozzle members that are movable relative to each other.

According to one or more embodiments, there is provided a cleaning tool on which an attachment is attachable, the attachment including a plurality of connection members provided to be movable closer to each other and away from each other, each of the plurality of connection members including an attachment portion attached to each tip portion of nozzle members, and a tubular portion which protrudes from the attachment portion and into which a ferrule is inserted, the cleaning tool including: a plurality of cleaning bodies which clean a connection end surface of the ferrule; a plurality of head members which press each of the plurality of cleaning bodies against the connection end surface; a plurality of nozzle members which respectively accommodate the plurality of head members; a feeding mechanism which supplies and withdraws the plurality of cleaning bodies with respect to the plurality of head members; and an accommodating body which accommodates the feeding mechanism, in which the plurality of nozzle members are provided to be movable closer to each other and away from each other in a lateral direction in which the plurality of nozzle members are arranged, a tip guide portion which protrudes in a longitudinal direction of the nozzle members and of which an inside communicates with an inside of each of the nozzle members is formed at a tip portion of each of the plurality of nozzle members, and the attachment is attachable to and detachable from the tip portion of each of the nozzle members.

According to the cleaning tool according to one or more embodiments, by attaching the attachment, it is possible to align the positions between the plurality of exposed ferrules and the plurality of nozzle members with each other. Further, in a state where the attachment is removed, it is possible to more accurately determine the position of the nozzle member and the ferrule, for example, by inserting the end portion of the ferrule into the tip guide portion.

According to one or more embodiments, it is possible to provide a cleaning tool with an attachment, an attachment, or a cleaning tool capable of aligning positions between a plurality of exposed ferrules and a plurality of nozzle members movable relative to each other.

DETAILED DESCRIPTION

Hereinafter, embodiments of the present invention will be described with reference to the drawings.

Figure 1:
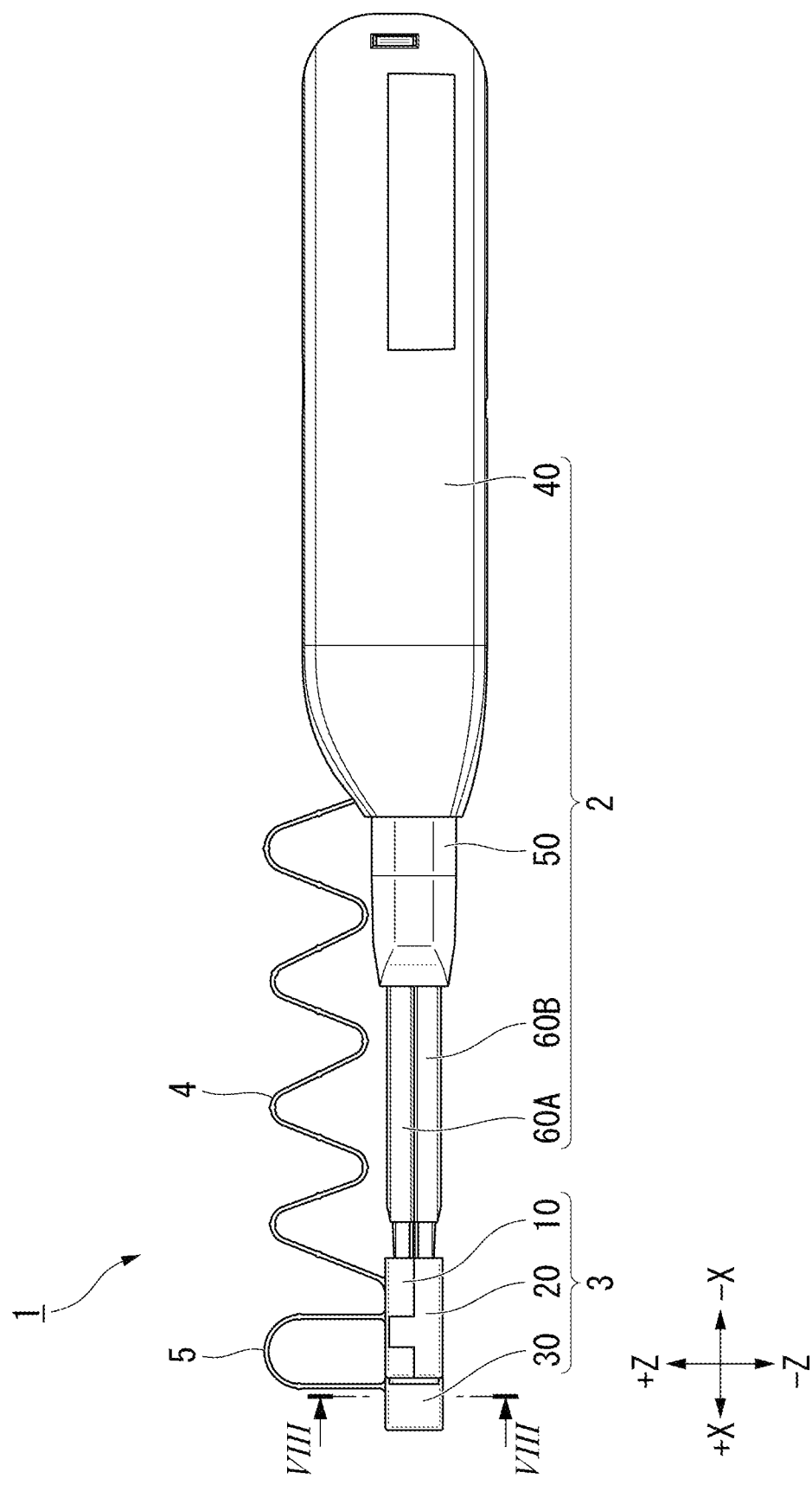
FIG. 1 is an overall view of a cleaning tool with an attachment according to one or more embodiments.

As shown in FIG. 1, a cleaning tool with an attachment 1 (attachment cleaning tool) includes a cleaning tool 2 and an attachment 3 that is attachable to and detachable from the cleaning tool 2.

The cleaning tool 2 includes a main body portion 40, an outer tubular body 50, and a plurality of nozzle members 60A, 60B.

The attachment 3 includes a first connection member 10, a second connection member 20, and a cap 30. The first connection member 10 and the second connection member 20 have a role of connecting the nozzle members 60A, 60B and the ferrule 81 to each other when an exposed ferrule 81 (described below) is cleaned by the cleaning tool 2. The first connection member 10 and the second connection member 20 can move relative to each other within a predetermined range. The first connection member 10 is connected to the main body portion 40 by a first string portion 4. The cap 30 is connected to the first connection member 10 by a second string portion 5.

(Direction Definition)

In one or more embodiments, an XYZ Cartesian coordinate system is set and a positional relationship of each configuration is described. An X-axis direction is a direction in which the nozzle members 60A, 60B extend. A Z-axis direction is a direction in which a plurality of nozzle members 60A, 60B are arranged side by side. A Y-axis direction is a direction orthogonal to both the X-axis direction and the Z-axis direction.

Hereinafter, the X-axis direction is referred to as a longitudinal direction X, the Z-axis direction is referred to as a lateral direction Z, and the Y-axis direction is referred to as an orthogonal direction Y. Further, along the longitudinal direction X, the main body portion 40 side of the cleaning tool 2 is referred to as a −X side, and the attachment 3 side is referred to as a +X side. Along the lateral direction Z, the first nozzle member 60A side is referred to as a +Z side, and the second nozzle member 60B side is referred to as a −Z side. Along the orthogonal direction Y, one (first direction) side is referred to as a +Y side, and the other (second direction) side is referred to as a −Y side.

Figure 2A:
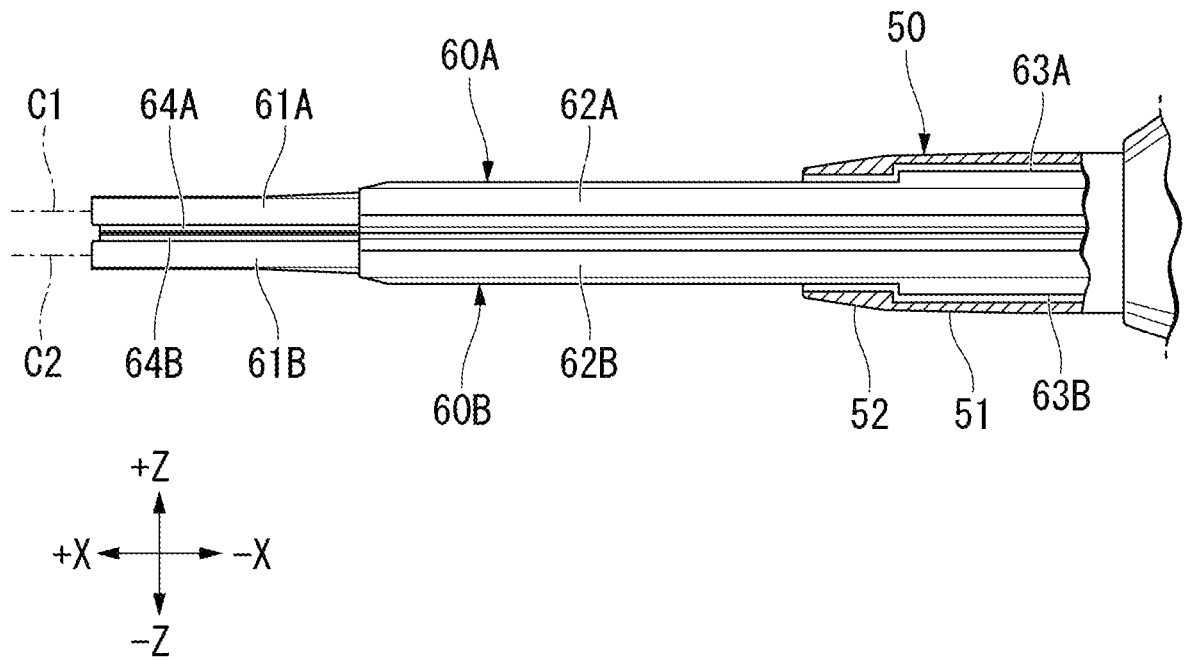
FIG. 2A is a diagram showing a state in which an attachment is removed from the cleaning tool with an attachment according to one or more embodiments.

The nozzle members 60A, 60B are formed in a tubular shape extending along the longitudinal direction X. As shown in FIG. 2A, in the present specification, a central axis of the first nozzle member 60A is referred to as a first central axis C1, and a central axis of the second nozzle member 60B is referred to as a second central axis C2.

Figure 2B:
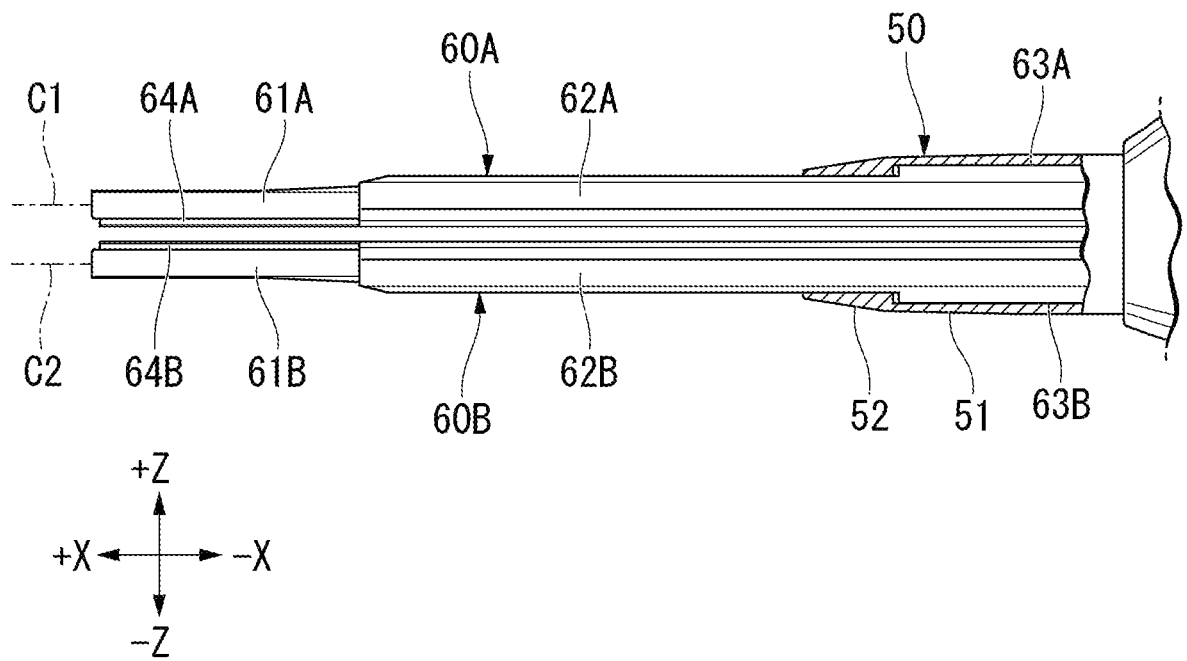
FIG. 2B is a diagram showing a state in which a plurality of nozzle members of FIG. 2A are away from each other.

As shown in FIGS. 2A, 2B, the nozzle members 60A, 60B are provided to be movable closer to and away from each other in the lateral direction Z. The nozzle member 60A has tip portion 61A, intermediate portion 62A, and base portion 63A. The nozzle member 60B has tip portion 61B, intermediate portion 62B, and base portion 63B. The nozzle members 60A, 60B are formed in a symmetrical shape in the lateral direction Z. In the lateral direction Z, dimensions of the intermediate portions 62A, 62B are larger than dimensions of the tip portions 61A, 61B, and dimensions of the base portions 63A, 63B are larger than the dimensions of the intermediate portions 62A, 62B.

The outer tubular body 50 is formed in a tubular shape extending along the longitudinal direction X. The outer tubular body 50 covers the base portions 63A, 63B and −X side end portions of the intermediate portions 62A, 62B of the nozzle members 60A, 60B from the outside. The outer tubular body 50 has a large diameter portion 51 and a small diameter portion 52. The small diameter portion 52 is located on the +X side of the large diameter portion 51. The small diameter portion 52 is a portion of the outer tubular body 50 that opens toward the +X side. A dimension of an internal space of the small diameter portion 52 in the lateral direction Z is smaller than a dimension of an internal space of the large diameter portion 51 in the lateral direction Z.

As shown in FIG. 2A, in a state where the nozzle members 60A, 60B abut on each other, a gap in the lateral direction Z is formed between the intermediate portions 62A, 62B and the small diameter portion 52 and between the base portions 63A, 63B and the large diameter portion 51. Therefore, as shown in FIG. 2B, the nozzle members 60A, 60B are movable away from each other until the intermediate portions 62A, 62B abut on an inner surface of the small diameter portion 52 or the base portions 63A, 63B abut on an inner surface of the large diameter portion 51.

Since no partition or the like is provided inside the outer tubular body 50, the nozzle members 60A, 60B are movable closer to each other to a position where the nozzle members 60A, 60B abut on each other, as shown in FIG. 2A.

Figure 3:
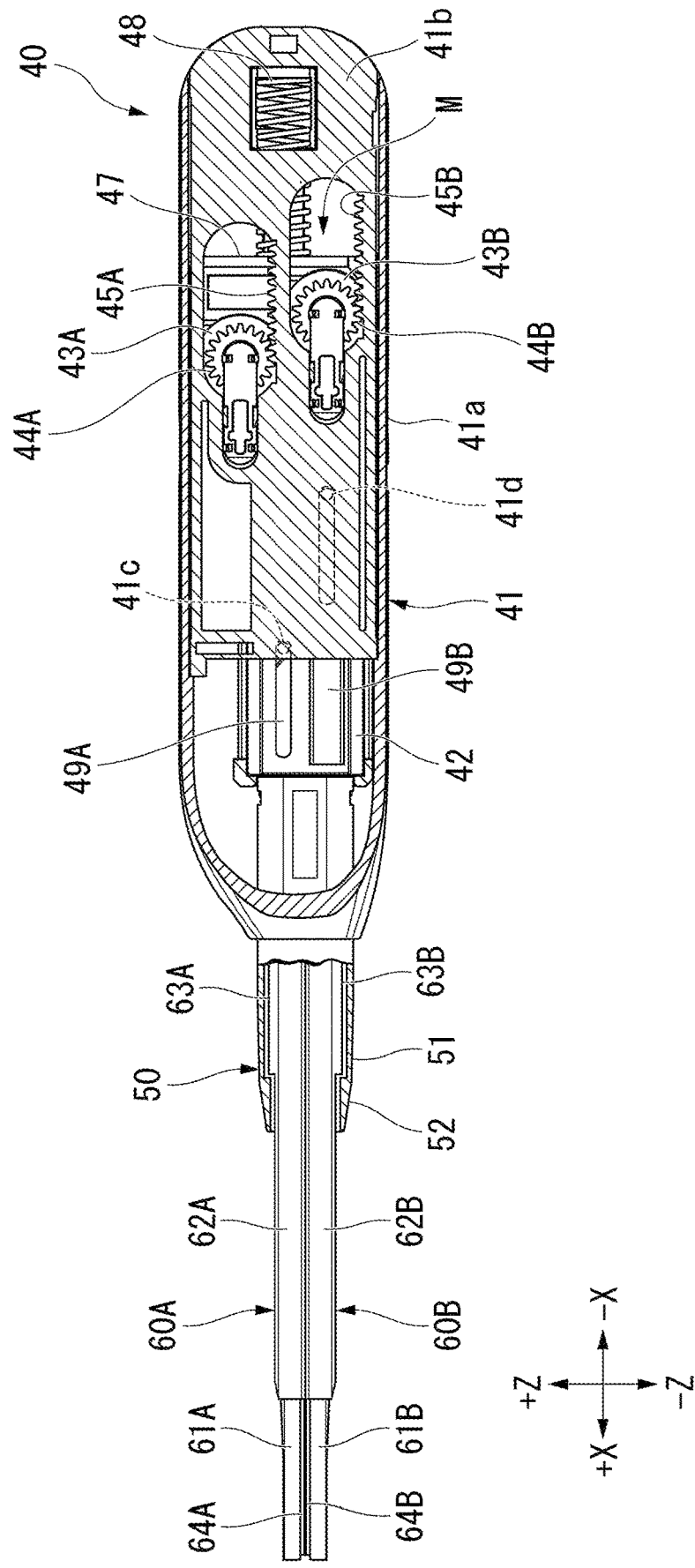
FIG. 3 is a partial cross-sectional view showing an internal structure of the cleaning tool according one or more embodiments.

As shown in FIG. 3, the main body portion 40 has a feeding mechanism M and an accommodating body 41 that accommodates the feeding mechanism M. The feeding mechanism M supplies and withdraws the cleaning bodies 6A, 6B with respect to head members 70A, 70B (refer to FIGS. 7A, 7B) accommodated in the nozzle members 60A, 60B. A material of the cleaning bodies 6A, 6B is not particularly limited, and for example, it is possible to use a material obtained by processing a cleaning cloth (nonwoven fabric, woven cloth, or the like) into a thread shape (or string shape) or a tape shape. For example, the cleaning bodies 6A, 6B may be formed of ultrafine fibers such as polyester and nylon.

As shown in FIG. 3, the feeding mechanism M includes take-up reels 43A, 43B, gears 44A, 44B, and gear receiving portions 45A, 45B. Further, as shown in FIG. 4, the feeding mechanism M includes supply reels 46A, 46B, a support 47, and holding portions 48A, 48B.

The support 47 supports the take-up reels 43A, 43B, the gears 44A, 44B, the gear receiving portions 45A, 45B, the supply reels 46A, 46B, and the holding portions 48A, 48B.

Figure 4:
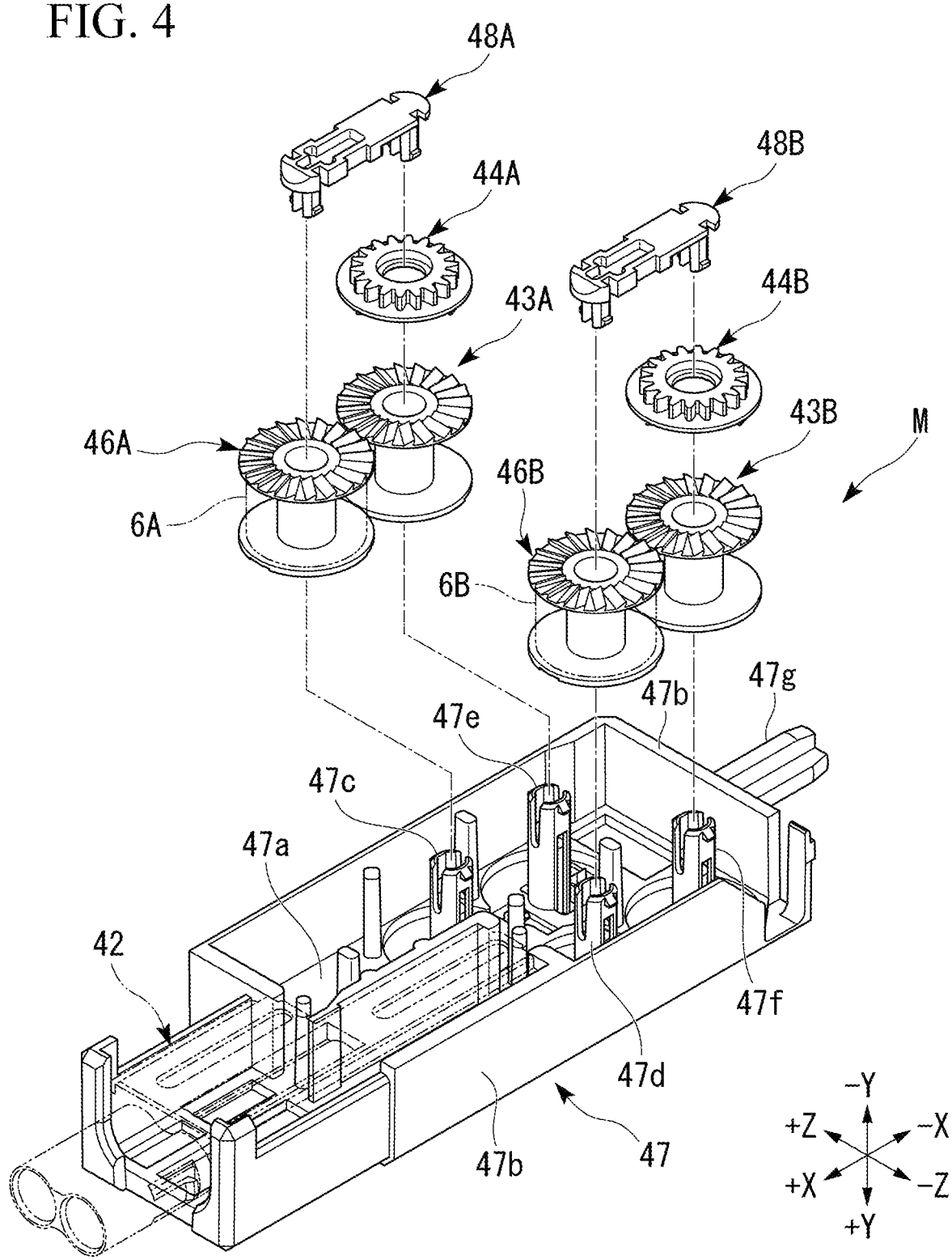
FIG. 4 is an exploded perspective view showing the internal structure of the cleaning tool according to one or more embodiments.

As shown in FIG. 4, a bottom wall 47a, side walls 47b, supply reel support shafts 47c, 47d, take-up reel support shafts 47e, 47f, and a holding protrusion 47g are formed in the support 47. The bottom wall 47a is formed in a plate shape extending along the longitudinal direction X and the lateral direction Z, and the side wall 47*b* extends from an outer peripheral edge of the bottom wall 47*a* toward the −Y side. The supply reel support shafts 47*c*, 47*d* and the take-up reel support shafts 47*e*, 47*f* are located in a space surrounded by the bottom wall 47*a* and the side wall 47*b*. The supply reel support shafts 47*c*, 47*d* and the take-up reel support shafts 47*e*, 47*f* extend from the bottom wall 47*a* toward the −Y side. The first supply reel support shaft 47*c* rotatably supports the first supply reel 46A, and the second supply reel support shaft 47*d* rotatably supports the second supply reel 46B.

The first take-up reel support shaft 47*e* rotatably supports the first take-up reel 43A and the first gear 44A, and the second take-up reel support shaft 47*f* rotatably supports the second take-up reel 43B and the second gear 44B. The holding portions 48A, 48B prevent the reels 43A, 43B, 46A, 46B inserted into the shafts 47*c* to 47*f* from falling off.

The holding protrusion 47*g* protrudes from the side wall 47*b* located at a −X-side end portion toward the −X side. The holding protrusion 47*g* holds a biasing member 48 (refer to FIG. 3). The biasing member 48 biases the support 47 toward the +X side.

The supply reels 46A, 46B include a body portion around which the cleaning bodies 6A, 6B are wrapped, and flange portions provided at both ends of the body portion. The supply reels 46A, 46B supply the cleaning bodies 6A, 6B toward the head members 70A, 70B. The take-up reels 43A, 43B wind up the cleaning bodies 6A, 6B that have returned to the main body portion 40 from the supply reels 46A, 46B via the head members 70A, 70B. The take-up reels 43A, 43B have body portions for winding the cleaning bodies 6A, 6B, and flange portions provided at both ends of the body portion.

As shown in FIG. 3, the accommodating body 41 includes a tubular case portion 41*a*, and a pressing body 41*b* located in the case portion 41*a* and fixed by the case portion 41*a*. The gear receiving portions 45A, 45B are formed in the pressing body 41*b* and engage with the gears 44A, 44B. Insertion convex portions 41*c*, 41*d* that protrude toward the +Y side are formed in the case portion 41*a*. The insertion convex portions 41*c*, 41*d* are inserted into spiral cam groove portions formed on the outer peripheral surfaces of the rotating shafts 49A, 49B. Therefore, when the rotating shafts 49A, 49B move in the longitudinal direction X with respect to the accommodating body 41, the rotating shafts 49A, 49B rotate with respect to a central axis of each shaft. The first head member 70A is attached to a tip of the first rotating shaft 49A in a state where a rotation with respect to the first rotating shaft 49A is restricted. The second head member 70B is attached to a tip of the second rotating shaft 49B in a state where a rotation with respect to the second rotating shaft 49B is restricted. Therefore, when the rotating shafts 49A, 49B rotate, the head members 70A, 70B also rotates with respect to each central axis of the head member. The head members 70A, 70B may rotate with respect to the first central axis C1 and the second central axis C2.

As shown in FIG. 3, a tubular body 42 is accommodated inside the accommodating body 41. The tubular body 42 is formed in a tubular shape extending along the longitudinal direction X, and a portion of each of the rotating shafts 49A, 49B is inserted therein. The insertion convex portions 41*c*, 41*d* are inserted into the spiral cam groove portions of the rotating shafts 49A, 49B through an opening formed in the tubular body 42.

Figure 5A:
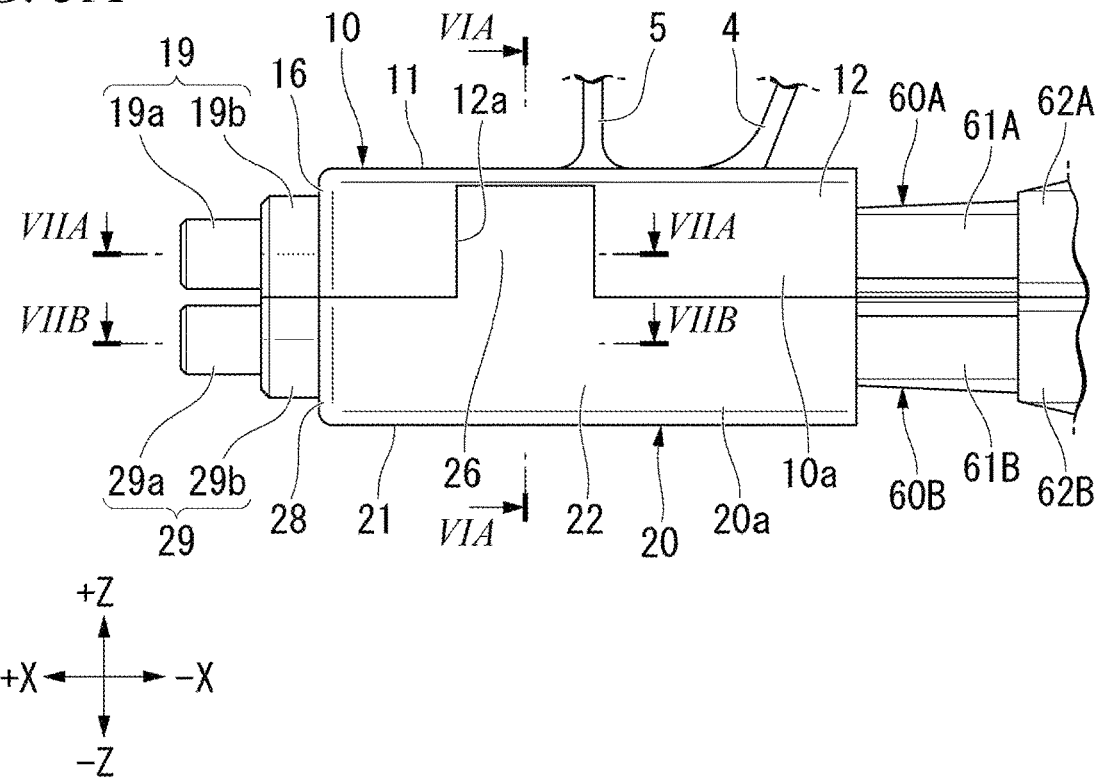
FIG. 5A is an enlarged view of the vicinity of the attachment of FIG. 1 and shows a state in which the cap is removed.
Figure 5B:
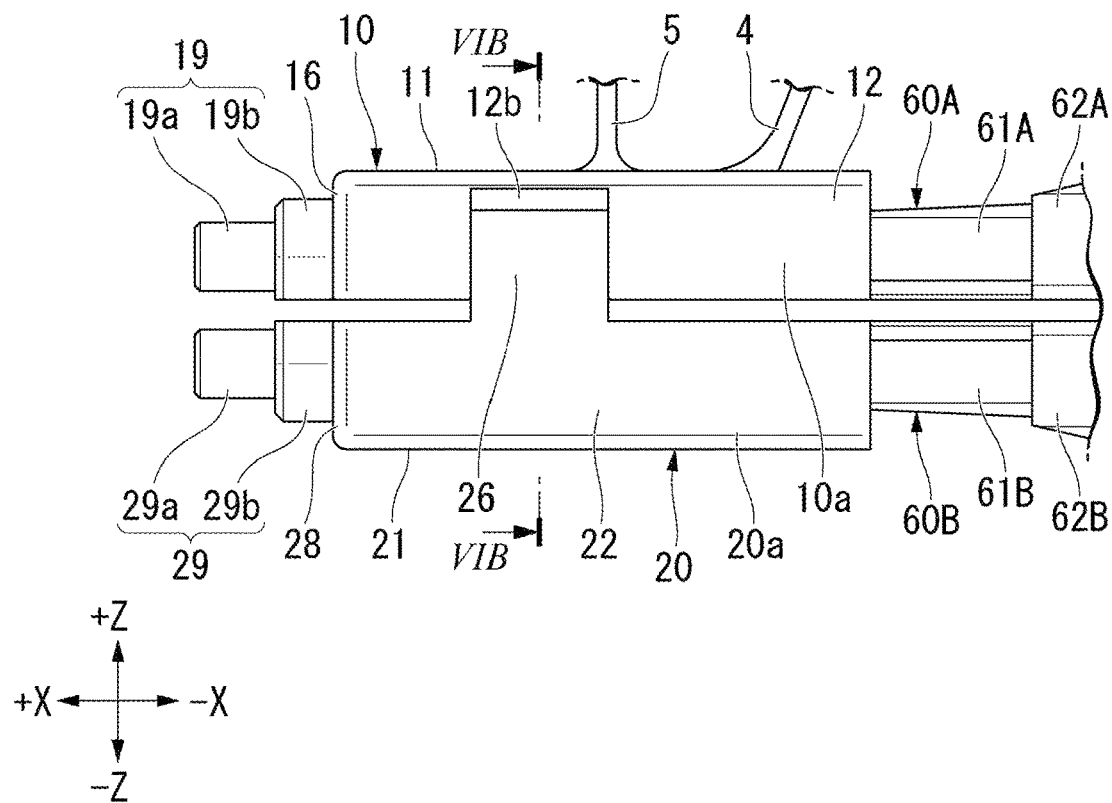
FIG. 5B is a diagram showing a state in which a spacing between connection members of FIG. 5A is widened.

As shown in FIGS. 5A, 5B, the first connection member 10 and the second connection member 20 are movable relative to each other in a direction of moving closer to or away from each other in the lateral direction Z. The first connection member 10 is attached to the tip portion 61A of the first nozzle member 60A, and the second connection member 20 is attached to the tip portion 61B of the second nozzle member 60B. The first connection member 10 and the second connection member 20 is formed in a box shape that opens toward the −X side. When the first connection member 10 and the second connection member 20 are attached to the nozzle members 60A, 60B, the tip portions 61A, 61B of the nozzle members 60A, 60B are inserted through the −X side opening portions of the connection members 10, 20.

Figure 6A:
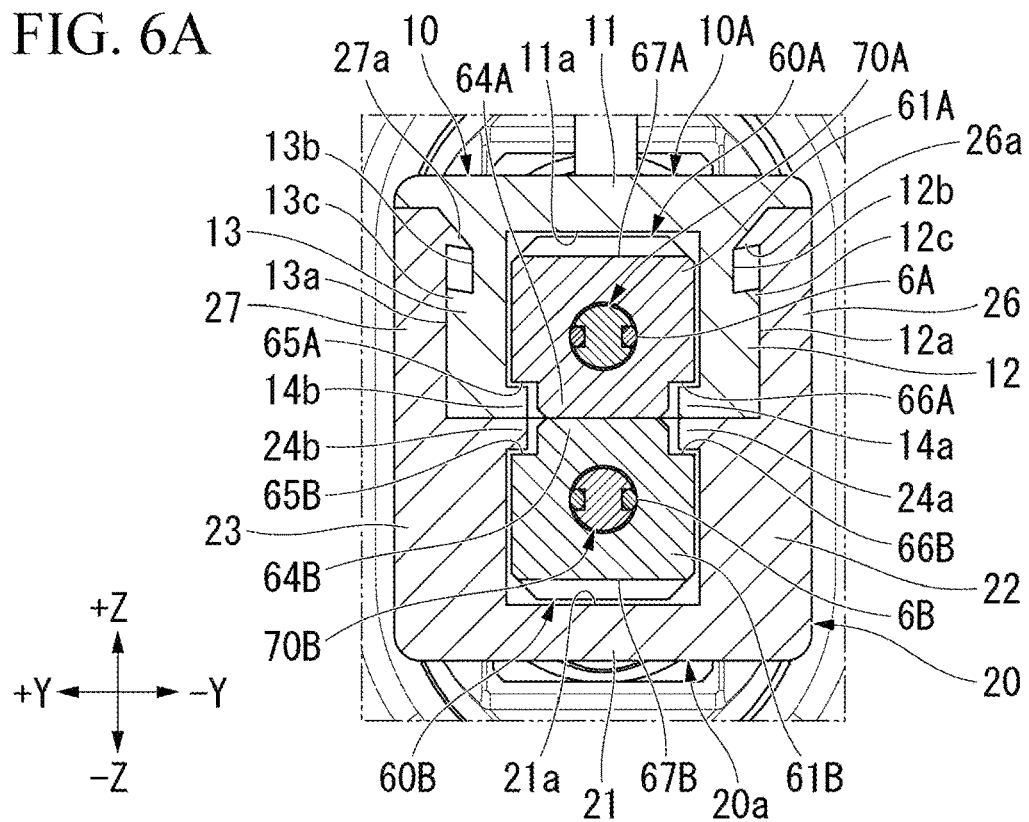
FIG. 6A is a cross-sectional view taken along line VIA-VIA of FIG. 5A.

As shown in FIG. 6A, the first connection member 10 has an upper wall portion 11, a first right wall portion 12, and a first left wall portion 13. The upper wall portion 11, the first right wall portion 12, and the first left wall portion 13 form a first attachment portion 10*a*. The first attachment portion 10*a* is a portion attached to the tip portion 61A of the first nozzle member 60A (refer to FIG. 5A). The upper wall portion 11 is formed in a plate shape extending along the longitudinal direction X and the orthogonal direction Y. The first right wall portion 12 extends from a −Y side end portion of the upper wall portion 11 toward the −Z side. The first left wall portion 13 extends from a +Y side end portion of the upper wall portion 11 toward the −Z side. The tip portion 61A of the first nozzle member 60A is accommodated inside a space formed by the upper wall portion 11, the first right wall portion 12, and the first left wall portion 13. The upper wall portion 11 faces a first outer abutment surface 67A of the tip portion 61A in the lateral direction Z. The first outer abutment surface 67A faces the +Z side. When the nozzle members 60A, 60B are away from each other in the lateral direction Z, a surface of the upper wall portion 11 facing the −Z side becomes a first outer regulation surface 11*a* (outer regulation surface) that abuts on the first outer abutment surface 67A.

An inner regulation portion 14*a* protruding toward the +Y side is formed at a −Z side end portion of the first right wall portion 12. An inner regulation portion 14*b* protruding toward the −Y side is formed at a −Z side end portion of the first left wall portion 13. Although not shown, the inner regulation portion 14*a* and the inner regulation portion 14*b* extend along the longitudinal direction X. A gap is provided between the inner regulation portion 14*a* and the inner regulation portion 14*b* in the orthogonal direction Y.

As shown in FIG. 6A, a first protruding portion 64A that protrudes toward the −Z side is formed at the tip portion 61A of the first nozzle member 60A. The first protruding portion 64A is provided at a central portion of the tip portion 61A in the orthogonal direction Y. An inner abutment surface 65A facing the −Z side is formed on the +Y side of the first protruding portion 64A. An inner abutment surface 66A facing the −Z side is formed on the −Y side of the first protruding portion 64A. As shown in FIG. 6A, the first protruding portion 64A is located between the inner regulation portion 14*a* and the inner regulation portion 14*b* in a state where the first nozzle member 60A and the second nozzle member 60B are close to each other. The inner abutment surface 65A faces the inner regulation portion 14*b* in the lateral direction Z, and the inner abutment surface 66A faces the inner regulation portion 14*a* in the lateral direction Z.

The second connection member 20 has a lower wall portion 21, a second right wall portion 22, and a second left wall portion 23. The lower wall portion 21, the second right wall portion 22, and the second left wall portion 23 form a second attachment portion 20*a* (refer to FIG. 5A). The second attachment portion 20a is a portion attached to the tip portion 61B of the second nozzle member 60B. The lower wall portion 21 is formed in a plate shape extending along the longitudinal direction X and the orthogonal direction Y. The second right wall portion 22 extends from a −Y side end portion of the lower wall portion 21 toward the +Z side. The second left wall portion 23 extends from a +Y side end portion of the lower wall portion 21 toward the +Z side. The tip portion 61B of the second nozzle member 60B is accommodated inside a space formed by the lower wall portion 21, the second right wall portion 22, and the second left wall portion 23. The lower wall portion 21 faces the second outer abutment surface 67B of the tip portion 61B in the lateral direction Z. The second outer abutment surface 67B faces the −Z side. When the nozzle members 60A, 60B are away from each other in the lateral direction Z, a surface of the lower wall portion 21 facing the +Z side becomes a second outer regulation surface 21a (outer regulation surface) that abuts on the second outer abutment surface 67B.

An inner regulation portion 24a protruding toward the +Y side is formed at a +Z side end portion of the second right wall portion 22. An inner regulation portion 24b protruding toward the −Y side is formed at a +Z side end portion of the second left wall portion 23. Although not shown, the inner regulation portion 24a and the inner regulation portion 24b extend along the longitudinal direction X. A gap is provided between the inner regulation portion 24a and the inner regulation portion 24b in the orthogonal direction Y.

As shown in FIG. 6A, a second protruding portion 64B that protrudes toward the +Z side is formed at the tip portion 61B of the second nozzle member 60B. The second protruding portion 64B is provided at a central portion of the tip portion 61B in the orthogonal direction Y. An inner abutment surface 65B facing the +Z side is formed on the +Y side of the second protruding portion 64B. An inner abutment surface 66B facing the +Z side is formed on the −Y side of the second protruding portion 64B. As shown in FIG. 6A, the second protruding portion 64B is located between the inner regulation portion 24a and the inner regulation portion 24b in a state where the first nozzle member 60A and the second nozzle member 60B are close to each other. The inner abutment surface 65B faces the inner regulation portion 24b in the lateral direction Z, and the inner abutment surface 66B faces the inner regulation portion 24a in the lateral direction Z.

As shown in FIG. 5A, a groove portion 12a is formed in the first right wall portion 12 of the first connection member 10. The groove portion 12a is located at an intermediate portion of the first right wall portion 12 in the longitudinal direction X. The groove portion 12a extends along the lateral direction Z and is open toward the −Z side. The groove portion 12a is recessed from a surface of the first right wall portion 12 facing the −Y side toward the +Y side. As shown in FIG. 6A, a concave portion 12b further recessed toward the +Y side is formed at a +Z side end portion of the groove portion 12a.

As shown in FIG. 6A, a groove portion 13a similar to the groove portion 12a is also formed in the first left wall portion 13 of the first connection member 10. Although not shown, the groove portion 13a is located at intermediate portion of the first left wall portion 13 in the longitudinal direction X. The groove portion 13a extends along the lateral direction Z and is open toward the −Z side. The groove portion 13a is recessed from a surface of the first left wall portion 13 facing the +Y side toward the −Y side. As shown in FIG. 6A, a concave portion 13b further recessed toward the −Y side is formed at a +Z side end portion of the groove portion 13a.

Locking pieces 26, 27 are formed in the second connection member 20. The locking piece 26 extends from the second right wall portion 22 of the second connection member 20 toward the +Z side, and the locking piece 27 extends from the second left wall portion 23 of the second connection member 20 toward the +Z side. The locking piece 26 is located in the groove portion 12a, and the locking piece 27 is located in the groove portion 13a. The locking pieces 26, 27 are slidable with respect to the groove portions 12a, 13a, respectively. A locking portion 26a protruding toward the +Y side is formed at a +Z side end portion of the locking piece 26. A locking portion 27a protruding toward the −Y side is formed at a +Z side end portion of the locking piece 27.

A locking protruding portion 12c that is locked to the locking portion 26a is formed in the groove portion 12a, and a locking protruding portion 13c that is locked to the locking portion 27a is formed in the groove portion 13a. At least a portion of the locking portion 26a is located in the concave portion 12b and faces the locking protruding portion 12c in the lateral direction Z. At least a portion of the locking portion 27a is located in the concave portion 13b and faces the locking protruding portion 13c in the lateral direction Z. When assembling the second connection member 20 to the first connection member 10, the locking pieces 26, 27 are made to enter the groove portions 12a, 13a from below. At this case, the locking pieces 26, 27 are elastically deformed outward in the orthogonal direction Y, and when the locking portions 26a, 27a reach the concave portions 12b, 13b, the locking pieces 26, 27 are deformed and restored.

With the above configuration, the first connection member 10 and the second connection member 20 can move relative to each other within a predetermined range in the lateral direction Z following relative movements of the nozzle members 60A, 60B.

For example, when the nozzle members 60A, 60B move to be away from each other in the lateral direction Z from the state shown in FIG. 6A, the first outer abutment surface 67A of the first nozzle member 60A and the first outer regulation surface 11a of the first connection member 10 abut on each other, and the second outer abutment surface 67B of the second nozzle member 60B and the second outer regulation surface 21a of the second connection member 20 abut on each other. As a result, following the nozzle members 60A, 60B, the first connection member 10 and the second connection member 20 move to be away from each other in the lateral direction Z.

Figure 6B:
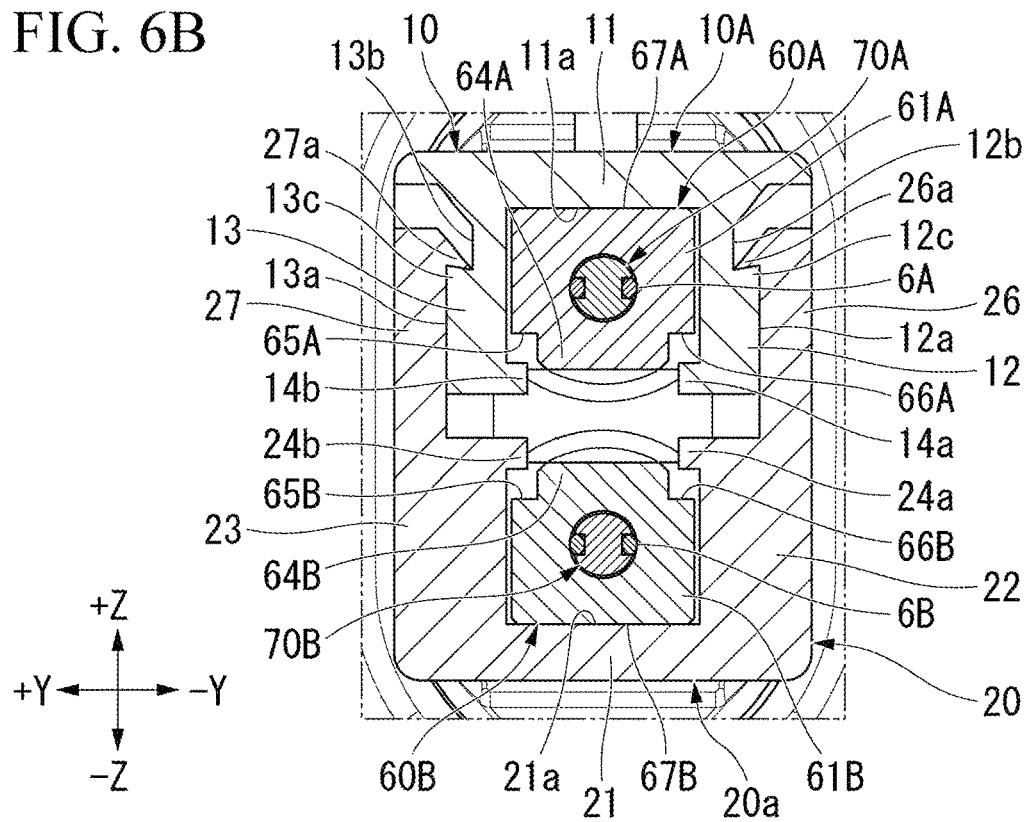
FIG. 6B is a cross-sectional view taken along line VIB-VIB of FIG. 5B.

When the first connection member 10 and the second connection member 20 move relative to each other by a predetermined amount to be away from each other in the lateral direction Z, the locking portions 26a, 27a abut on the locking protruding portions 12c, 13c as shown in FIG. 6B. Therefore, the relative movement of the first connection member 10 and the second connection member 20 exceeding a predetermined amount is restricted.

When the nozzle members 60A, 60B move closer to each other in the lateral direction Z from the state shown in FIG. 6B, the inner abutment surface 66A of the first nozzle member 60A abuts on the inner regulation portion 14a and the inner abutment surface 65A abuts on the inner regulation portion 14b. Further, the inner abutment surface 66B of the second nozzle member 60B abuts on the inner regulation portion 24a and the inner abutment surface 65B abuts on the inner regulation portion 24b. As a result, following the nozzle members 60A, 60B, the first connection member 10 and the second connection member 20 move to be close to each other in the lateral direction Z.

As shown in FIG. 5A, the first connection member 10 has a first front wall portion 16 and a first tubular portion 19. The front wall portion 16 is formed to cover +X side end portions of the upper wall portion 11, the first right wall portion 12, and the first left wall portion 13. The second connection member 20 has a second front wall portion 28 and a second tubular portion 29. The front wall portion 28 is formed to cover +X side end portions of the lower wall portion 21, the second right wall portion 22, and the second left wall portion 23.

The first tubular portion 19 protrudes from the first front wall portion 16 toward the +X side, and the second tubular portion 29 protrudes from the second front wall portion 28 toward the +X side. The first tubular portion 19 has a first tip tubular portion 19a and a first press-fitting portion 19b. The second tubular portion 29 has a second tip tubular portion 29a and a second press-fitting portion 29b. The tip tubular portions 19a, 29a are formed in a tubular shape and are located on the +X side of the press-fitting portions 19b, 29b.

Figure 7A:
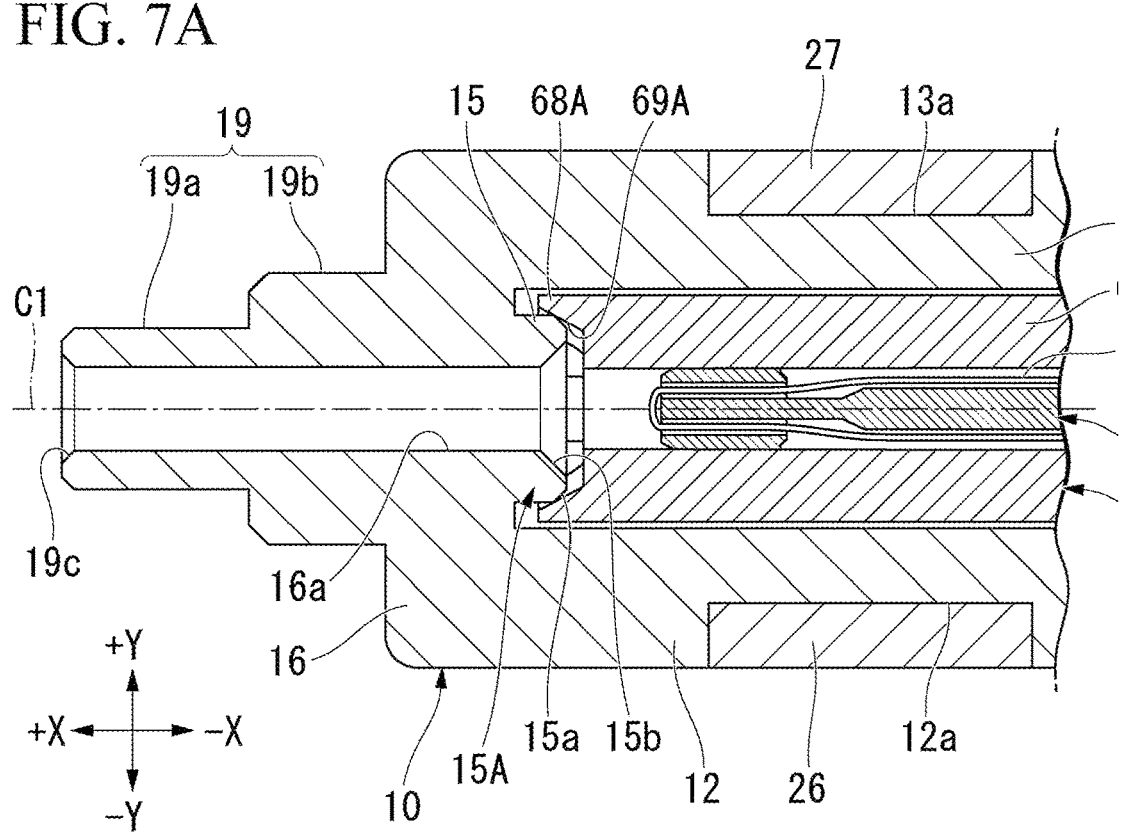
FIG. 7A is a cross-sectional view taken along line VIIA-VIIA of FIG. 5A.

As shown in FIG. 7A, an inclined surface 19c is formed in a +X side opening portion of the first tip tubular portion 19a. The inclined surface 19c extends toward the −X side, and gradually approaches the first central axis C1. A first through hole 16a connected to the space inside the first tubular portion 19 is formed in the first front wall portion 16. The first through hole 16a passes through the first front wall portion 16 in the longitudinal direction X. An abutment portion 15A on which the tip portion 61A abuts is formed inside the first connection member 10. A first inner tubular portion 15 protruding from a −X-side opening portion of the first through hole 16a toward the −X side is formed in the abutment portion 15A. Inclined surfaces 15a, 15b are formed at a −X-side end portion of the first inner tubular portion 15. The inclined surface 15a is formed on an outer peripheral surface of the first inner tubular portion 15. The inclined surface 15a extends toward the −X side, and gradually approaches the first central axis C1. The inclined surface 15b is formed on an inner peripheral surface of the first inner tubular portion 15. The inclined surface 15b extends toward the +X side, and gradually approaches the first central axis C1.

When the first head member 70A moves toward the +X side, the first head member 70A is guided by the inclined surface 15b of the first inner tubular portion 15. As a result, it is possible to introduce the first head member 70A into the first inner tubular portion 15 smoothly. Further, when one ferrule 81 (refer to FIGS. 9A, 9B) of an optical connector is inserted into the first tubular portion 19, the inclined surface 19c of the first tip tubular portion 19a guides the ferrule 81. As a result, it is possible to introduce the ferrule 81 into the first tip tubular portion 19a smoothly.

Inner diameters of the first inner tubular portion 15, the first through hole 16a, and the first tubular portion 19 are substantially constant along the longitudinal direction X except for the portions where the inclined surfaces 19c, 15b are formed.

Figure 7B:
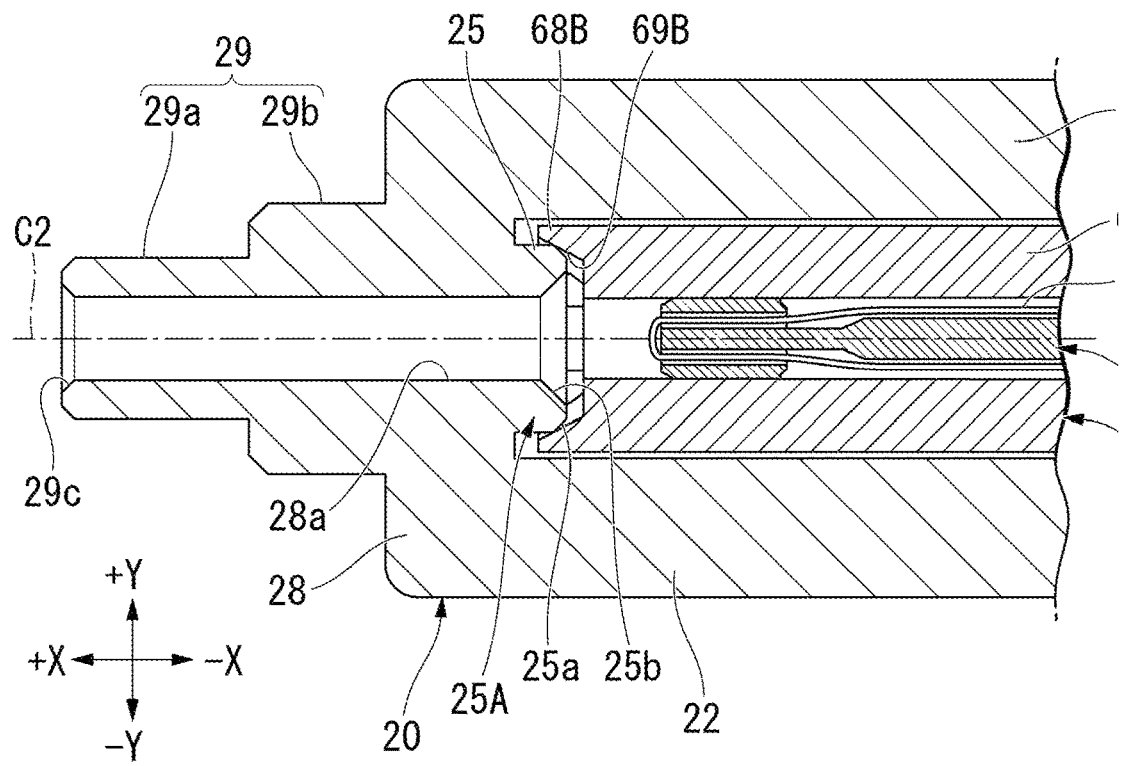
FIG. 7B is a cross-sectional view taken along line VIIB-VIIB of FIG. 5A.

As shown in FIG. 7B, an inclined surface 29c is formed in a +X side opening portion of the second tip tubular portion 29a. The inclined surface 29c extends toward the −X side, and gradually approaches the second central axis C2. A second through hole 28a connected to a space inside the second tubular portion 29 is formed in the second front wall portion 28. The second through hole 28a pass through the second front wall portion 28 in the longitudinal direction X.

An abutment portion 25A on which the tip portion 61B abuts is formed inside the second connection member 20. A second inner tubular portion 25 that protrudes from a −X-side opening portion of the second through hole 28a toward the −X side is formed in the abutment portion 25A. Inclined surfaces 25a, 25b are formed at −X-side end portions of the second inner tubular portion 25. The inclined surface 25a is formed on an outer peripheral surface of the second inner tubular portion 25. The inclined surface 25a extends toward the −X side, and gradually approaches the second central axis C2. The inclined surface 25b is formed on an inner peripheral surface of the second inner tubular portion 25. The inclined surface 25b extends toward the +X side, and gradually approaches the second central axis C2.

When the second head member 70B moves toward the +X side, the second head member 70B is guided by the inclined surface 25b of the second inner tubular portion 25. As a result, it is possible to introduce the second head member 70B into the second inner tubular portion 25 smoothly. Further, when one ferrule 81 (refer to FIGS. 9A, 9B) of the optical connector is inserted into the second tubular portion 29, the inclined surface 29c of the second tip tubular portion 29a guides the ferrule. As a result, it is possible to introduce the ferrule 81 introduced into the second tip tubular portion 29a smoothly.

Inner diameters of the second inner tubular portion 25, the second through hole 28a, and the second tubular portion 29 are substantially constant along the longitudinal direction X except for the portions where the inclined surfaces 29c and 15b are formed.

As shown in FIG. 7A, a first tip guide portion 68A is formed at the tip portion 61A of the first nozzle member 60A. The first tip guide portion 68A protrudes from the tip portion 61A toward the +X side. The first tip guide portion 68A is formed in a substantially bowl shape with a portion missing, and an inner peripheral surface thereof is a first inclined surface 69A. The first inclined surface 69A extends toward the −X side, and gradually approaches the first central axis C1. The inside of the first tip guide portion 68A communicates with the inside of the first nozzle member 60A. When the attachment 3 is attached to the cleaning tool 2, at least a portion of the first inner tubular portion 15 enters the inside of the first tip guide portion 68A. Then, the inclined surface 15a of the first inner tubular portion 15 and the first inclined surface 69A of the first nozzle member 60A abut on each other, and thus, it is possible to align the positions between the first inner tubular portion 15 and the first nozzle member 60A.

As shown in FIG. 7B, a second tip guide portion 68B is formed at the tip portion 61B of the second nozzle member 60B. The second tip guide portion 68B protrudes from the tip portion 61B toward the +X side. The second tip guide portion 68B is formed in a substantially bowl shape with a portion missing, and an inner peripheral surface thereof is an inclined surface 69B. The inclined surface 69B extends toward the −X side, and gradually approaches the second central axis C2. The inside of the second tip guide portion 68B communicates with the inside of the second nozzle member 60B. When the attachment 3 is attached to the cleaning tool 2, at least a portion of the second inner tubular portion 25 enters the inside of the second tip guide portion 68B. Then, the inclined surface 25a of the second inner tubular portion 25 and the inclined surface 69B of the second nozzle member 60B abut on each other, and thus, it is possible to align the positions between the second inner tubular portion 25 and the second nozzle member 60B.

The cap 30 is formed in a box shape that is open toward the −X side. By covering the tubular portions 19, 29 with the cap 30, it is possible to prevent dirt, dust, or the like from adhering to the tubular portions 19, 29. For example, the cap 30 is made of a resin.

Figure 8:
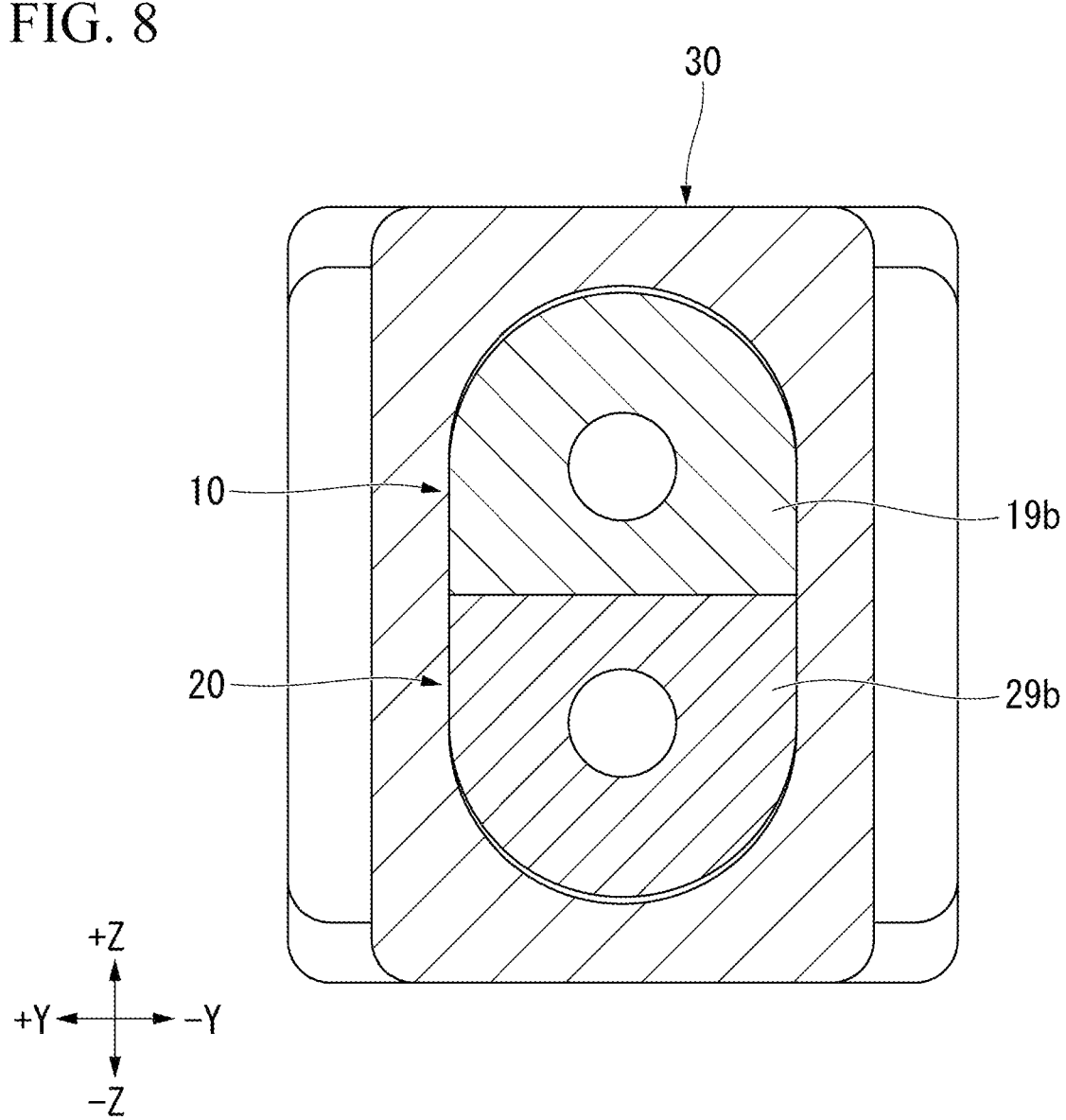
FIG. 8 is a cross-sectional view taken along line VIII-VIII of FIG. 1.

As shown in FIG. 8, the press-fitting portions 19b, 29b of the tubular portions 19, 29 are press-fitted into the inner surface of the cap 30 in the orthogonal direction Y. The press-fitting is made such that the cap 30 can be attached to and detached from the press-fitting portions 19b, 29b by force of a finger.

Meanwhile, the press-fitting portions 19b, 29b are not press-fitted into the inner surface of the cap 30 in the lateral direction Z. This is a configuration in consideration that the first connection member 10 and the second connection member 20 are movable relative to each other in the lateral direction Z. If the cap 30 is press-fitted into the press-fitting portions 19b, 29b in the lateral direction Z, it is necessary to press-fit the cap 30 with respect to the first connection member 10 and the second connection member 20 that are completely close to each other in the lateral direction Z, which makes it difficult to attach/detach the cap 30. Instead of this, by press-fitting the cap 30 in the orthogonal direction Y, it is possible to press-fit the cap 30 even when the first connection member 10 and the second connection member 20 are not completely close to each other, and to attach/detach the cap 30 easily. Further, even when the first connection member 10 and the second connection member 20 are most away from each other in the lateral direction Z, it is possible to press-fit the cap 30 into the press-fitting portions 19b, 29b.

Figure 9A:
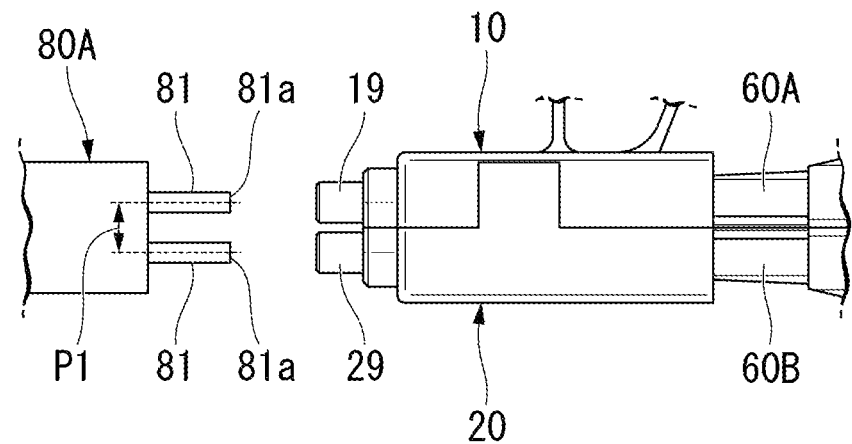
FIG. 9A is a diagram showing a state in which an optical connector having a small pitch between ferrules is cleaned using the cleaning tool with an attachment according to one or more embodiments.
Figure 9B:
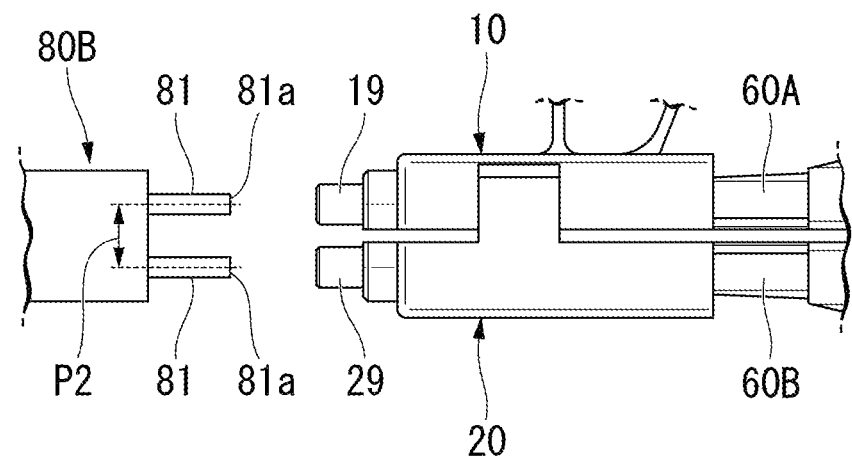
FIG. 9B is a diagram showing a state in which an optical connector having a large pitch between ferrules is cleaned using the cleaning tool with an attachment according to one or more embodiments.

FIGS. 9A, 9B show an example of a use state of the cleaning tool with an attachment 1 according to one or more embodiments. The cleaning tool with an attachment 1 is capable of cleaning the connection end surfaces 81a of optical connectors 80A, 80B from which the ferrules 81 are exposed. Although not shown, an optical fiber is accommodated inside each ferrule 81, and an end surface of the optical fiber is exposed from the connection end surface 81a.

The optical connector 80A shown in FIG. 9A and the optical connector 80B shown in FIG. 9B have different pitches between the two ferrules 81. A pitch P1 between the two ferrules of the optical connector 80A is, for example, about 3.1 mm, and a pitch P2 between the two ferrules of the optical connector 80B is, for example, about 3.8 mm. The pitches P1, P2 may be appropriately changed according to a standard of the optical connector or the like.

When the cleaning tool with an attachment 1 is used, as shown in FIGS. 9A, 9B, by moving the nozzle members 60A, 60B closer to each other or away from each other according to the pitches P1, P2 which are different depending on the optical connectors 80A, 80B, the positions of the tubular portions 19, 29 are aligned with the positions of the ferrules 81. Then, the ferrules 81 are inserted into the tubular portions 19, 29, respectively, and the cleaning tool 2 is pushed toward the optical connectors 80A, 80B. As a result, the head members 70A, 70B in the nozzle members 60A, 60B protrude from the tip portions 61A, 61B and are introduced into the tubular portions 19, 29. Within each of the tubular portions 19, 29, the positions of the central axes of the ferrules 81 and the head members 70A, 70B are aligned. As a result, the head members 70A, 70B are pressed against the connection end surfaces 81a, respectively, and the cleaning bodies 6A, 6B wrapped around the head members 70A, 70B abuts on the connection end surfaces 81a, respectively. Thus, it is possible to clean the connection end surfaces 81a by the cleaning bodies 6A, 6B.

As the cleaning tool 2 is pushed in, the head members 70A, 70B rotate with respect to the central axis of each head portion, and the cleaning bodies 6A, 6B are fed from the supply reels 46A, 46B to take-up reels 43A, 43B by the operation of the feeding mechanism M. By rotating the head members 70A, 70B, the connection end surface 81a is more reliably cleaned. Further, portions of the cleaning bodies 6A, 6B to which dirt has adhered are wrapped on the take-up reels 43A, 43B, and new cleaning bodies 6A, 6B having no dirt adhered are supplied from the supply reels 46A, 46B to the head members 70A, 70B. As a result, it is possible to repeatedly use the cleaning tool with an attachment 1.

Meanwhile, when cleaning the optical connector (optical adapter) in a state where the ferrules 81 are not exposed and are located in the connector accommodating hole, the attachment 3 is removed from the cleaning tool 2 and the nozzle members 60A, 60B are inserted into the connector accommodating holes. In this case, it is possible to align the positions between the nozzle members 60A, 60B and the ferrules by the connector accommodating holes. Further, for example, by inserting the end portion of the ferrules into the tip guide portions 68A, 68B, it is possible to determine the positions of the nozzle members 60A, 60B and the ferrules more accurately.

As described above, the cleaning tool with an attachment 1 according to one or more embodiments includes the cleaning tool 2 including the plurality of nozzle members 60A, 60B provided to be movable closer to each other and away from each other in the lateral direction Z, and the attachment 3 which is attached to the cleaning tool 2 and is detachable from the cleaning tool 2. Further, the attachment 3 includes the plurality of connection members 10, 20, and the plurality of connection members 10, 20 respectively include: the attachment portions 10a, 20a attached to the tip portions 61A, 61B of the nozzle members 60A, 60B; and the tubular portions 19, 29 which respectively protrude from the attachment portions 10a, 20a in the longitudinal direction X and into which the ferrule 81 is inserted. Then, the plurality of connection members 10, 20 move following the relative movement of the nozzle members 60A, 60B in the lateral direction Z. As a result, it is possible to simultaneously clean the plurality of connection end surfaces 81a included in one of the optical connectors 80A, 80B from which the plurality of ferrules 81 are exposed by the cleaning tool with the attachment 1 having the above configuration. Further, even when the optical connectors 80A, 80B have different pitches between the plurality of ferrules 81, it is possible clean the optical connectors 80A, 80B with the same cleaning tool with an attachment 1. Therefore, it is possible to save a trouble of changing the cleaning tool with the attachment 1 by the optical connectors 80A, 80B having different pitches between the ferrules 81, and to perform efficient cleaning.

Further, the tip guide portions 68A, 68B protruding toward the tubular portions 19, 29 (+X side) are formed at the tip portions 61A, 61B of the plurality of nozzle members 60A, 60B. Moreover, the abutment portions 15A, 25A on which the tip portions 61A, 61B abut are formed on the inner surfaces of the attachment portions 10a, 20a, and the inner tubular portions 15, 25 are formed on the abutment portions 15A, 25A, the inner tubular portions 15, 25 that protrude toward the nozzle members 60A, 60B (−X side) and enters the insides of the tip guide portions 68A, 68B to be in contact with the tip guide portions 68A, 68B. With this configuration, it is possible to align the positions between the tip portions 61A, 61B of the nozzle members 60A, 60B and the tubular portions 19, 29 easily. Therefore, when the head members 70A, 70B protrude from the nozzle members 60A, 60B, it is possible to introduce the head members 70A, 70B into the tubular portions 19, 29 smoothly.

Further, the first inclined surfaces 69A, 69B that incline so as to approach the central axes C1, C2 of the nozzle members 60A, 60B toward the accommodating body 41 (−X side) in the longitudinal direction X are formed on the inner surfaces of the tip guide portions 68A, 68B, and the second inclined surfaces 15a, 25a that incline so as to approach the central axes C1, C2 toward the accommodating body 41 in the longitudinal direction X are formed on the outer peripheral surfaces of the inner tubular portions 15, 25. With this configuration, when the attachment 3 is attached to the cleaning tool 2, it is possible to introduce the inner tubular portions 15, 25 into the tip guide portions 68A, 68B more smoothly. Therefore, it is possible to align the positions between the tip portions 61A, 61B of the nozzle members 60A, 60B and the tubular portions 19, 29 more reliably.

Further, the outer regulation surfaces 11a, 21a are respectively formed in the plurality of connection members 10, 20, the outer regulation surfaces 11a, 21a that abut on the outer abutment surfaces 67A, 67B of the nozzle members 60A, 60B facing outward in the lateral direction Z when the plurality of nozzle members 60A, 60B move away from each other in the lateral direction Z. With this configuration, when the nozzle members 60A, 60B move relative to each other to be away from each other, it is possible to move the nozzle members 60A, 60B following the connection members 10, 20 more reliably.

Further, the inner regulation portions 14a, 14b, 24a, 24b are formed in the plurality of connection members 10, 20, the inner regulation portions 14a, 14b, 24a, 24b that abut on the inner abutment surfaces 65A, 65B, 66A, 66B of the nozzle members 60A, 60B facing inward in the lateral direction Z when the plurality of nozzle members 60A, 60B move closer to each other in the lateral direction Z. With this configuration, when the nozzle members 60A, 60B move relative to each other to be closer to each other, it is possible to move the nozzle members 60A, 60B following the connection members 10, 20 more reliably.

Further, the attachment 3 has the cap 30 provided to be attachable to and detachable from the first connection member 10 and the second connection member 20. The cap 30 is not press-fitted into the press-fitting portions 19b, 29b of the tubular portions 19, 29 in the lateral direction Z, and is press-fitted into the press-fitting portions 19b, 29b in the orthogonal direction Y orthogonal to the lateral direction Z and the longitudinal direction X. With this configuration, it is possible to press-fit the cap 30 into the press-fitting portions 19b, 29b even in the state where the first connection member 10 and the second connection member 20 are not completely close to each other, and thus, the attachment/detachment operation of the cap 30 is more easily performed.

Further, the second connection member 20 includes; the pair of locking pieces 26, 27 which protrude in the lateral direction Z and are disposed at an interval in the orthogonal direction Y; and the pair of the locking portions 26a, 27a protruding inward in the orthogonal direction Y from each of the pair of locking pieces 26, 27. Then, the first connection member 10 includes the pair of groove portions 12a, 13a on which the pair of locking pieces 26, 27 respectively slide, and the pair of locking protruding portions 12c, 13c which are respectively locked to the pair of locking portions 26a, 27a. With this configuration, it is possible to make the first connection member 10 and the second connection member 20 move relative to each other, and to prevent the first connection member 10 and the second connection member 20 from unexpectedly falling off. Further, by elastically deforming the locking pieces 26, 27, it is possible to assemble the second connection member 20 to the first connection member 10.

The attachment 3 according to one or more embodiments is the attachment 3 mounted on the cleaning tool 2 for cleaning the connection end surfaces 81a of the optical connectors 80A, 80B by the cleaning bodies 6A, 6B and includes the plurality of connection members 10, 20 which are provided to be movable to closer to each other and away from each other, the plurality of connection members 10, 20 includes the attachment portions 10a, 20a attached to the tip portions 61A, 61B of the nozzle members 60A, 60B of the cleaning tool 2 and the tubular portions 19, 29 which protrude from the attachment portions 10a, 20a and into which the ferrule 81 is inserted, and the attachment 3 is attached to the tip portions 61A, 61B of the nozzle members 60A, 60B and is detachable from the tip portions 61A, 61B of the nozzle members 60A, 60B.

By attaching the attachment 3 to the cleaning tool 2 including a plurality of nozzle members 60A, 60B that is movable relative to each other, it is possible to align the positions between the plurality of exposed ferrules 81 and the plurality of nozzle members 60A, 60B with each other.

Further, since the attachment 3 is attachable and detachable, it is possible to clean the connection end surface 81a by the cleaning tool 2 regardless of whether or not the ferrules 81 are located in the connector accommodating holes.

In the cleaning tool 2 according to one or more embodiments, the plurality of nozzle members 60A, 60B are provided to be movable closer to each other and away from each other in the lateral direction Z in which the plurality of nozzle members 60A, 60B are arranged, the tip guide portions 68A, 68B which protrude in the longitudinal direction of the nozzle members 60A, 60B and of which the insides communicate with the insides of the nozzle members 60A, 60B are formed at the tip portions 61A, 61B of the plurality of nozzle members 60A, 60B, and thus, the attachment 3 is attachable to and detachable from the tip portions 61A, 61B of the nozzle members 60A, 60B.

According to the cleaning tool 2 having the above configuration, by attaching the attachment 3, it is possible to align the positions between the plurality of exposed ferrules 81 and the plurality of nozzle members 60A and 60B. Further, in the state where the attachment 3 is removed, it is possible to more accurately determine the positions of the nozzle members 60A, 60B and the ferrule 81, for example, by inserting the end portion of the ferrule 81 into the tip guide portions 68A, 68B.

The scope of the present invention is not limited to the above-described embodiments, and various modifications can be made without departing from a spirit of the present invention.

For example, as described above, in one or more embodiments, the number of nozzle members 60A, 60B is two, but the number of nozzle members may be three or more. Similarly, in one or more embodiments, the number of connection members 10, 20 included in the attachment 3 is two, but the number of connection members may be three or more. Also in these cases, the nozzle members are provided to be movable closer to and away from each other in the lateral direction Z, and each of the plurality of connection members attached to the nozzle members moves following the relative movement of the nozzle members in the lateral direction Z. Accordingly, the same action and effect as those of the above-described embodiments can be obtained.

When the number of connection members is 3 or more, for example, a third connection member may be provided on the +Z side of the first connection member 10. Then, the third connection member may include the pair of locking pieces extending toward the −Z side, the pair of locking protruding portions locked to the locking portions formed on the pair of locking pieces, and the pair of groove portions on which the pair of locking pieces slides. The pair of locking protruding portions and the pair of groove portions may be provided at positions deviated from the groove portion 12a, 13a of the first connection member 10 in the longitudinal direction X. With such a configuration, it is possible to prevent the three or more connection members from falling off while allowing the three or more connection members to move relative to each other in the lateral direction Z.

Further, as described above, in one or more embodiments, the structure is adopted in which the feeding mechanism M is operated by movement of the accommodating body 41 to feed and move the cleaning bodies 6A, 6B, but the structure for feeding and moving the cleaning bodies 6A, 6B is not limited to this. For example, it is possible to adopt a configuration in which an operator manually operates the take-up reel, a configuration in which a motor for operating the take-up reel is built-in, or the like.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Cleaning tool with attachment
2: Cleaning tool
3: Attachment
6A, 6B: Cleaning body
10: First connection member
10a, 20a: Attachment portion
11a, 21a: Outer regulation surface
12a, 13a: Groove portion
12c, 13c: Locking protruding portion
14a, 14b, 24a, 24b: Inner regulation portion
15, 25: Inner tubular portion
15A, 25A: Abutment portion
15a, 25a: Second inclined surface
19, 29: Tubular portion
20: Second connection member
26, 27: Locking piece
26a, 27a: Locking portion
30: Cap
41: Accommodating body
60A, 60B: Nozzle member
61A, 61B: Tip portion
65A, 65B, 66A, 66B: Inner abutment surface
67A, 67B: Outer abutment surface
68A, 68B: Tip guide portion
69A, 69B: First inclined surface
70A, 70B: Head member
80A, 80B: Optical connector
81: Ferrule
81a: Connection end surface
C1, C2: Central axis
M: Feeding mechanism
X: Longitudinal direction
Y: Orthogonal direction
Z: Lateral direction

What is claimed is:

1. An attachment cleaning tool, comprising:
a cleaning tool;
an attachment detachably attached to the cleaning tool;
a tip guide portion that protrudes toward the tubular portion and is formed at each tip portion of the nozzle members;
an abutment portion on which the tip portion abuts and that is formed on an inner surface of the attachment portion; and
an inner tubular portion formed at the abutment portion and that protrudes toward the nozzle member and enters an inside of the tip guide portion to be in contact with the tip guide portion, wherein
the cleaning tool comprises:
cleaning bodies that clean connection end surfaces of ferrules of an optical connector;
head members each that press the cleaning bodies against the connection end surfaces;
nozzle members that:
respectively accommodate the head members, and
move closer to each other or away from each other in a lateral direction in which the nozzle members are arranged;
a feeding mechanism that supplies and withdraws the cleaning bodies with respect to the head members; and
an accommodating body which accommodates the feeding mechanism,
the attachment comprises connection members that move following a relative movement of the nozzle members in the lateral direction, and
each of the connection members comprises:
an attachment portion attached to a tip portion of each of the nozzle members; and
a tubular portion that protrudes from the attachment portion in a longitudinal direction of the nozzle members and into which one of the ferrules is inserted.

2. The attachment cleaning tool according to claim 1, further comprising:
a first inclined surface that inclines to approach central axes of the nozzle members toward the accommodating body in the longitudinal direction and is formed on an inner surface of the tip guide portion; and
a second inclined surface that inclines to approach the central axes toward the accommodating body in the longitudinal direction and is formed on an outer peripheral surface of the inner tubular portion.

3. The attachment cleaning tool according to claim 1, further comprising:
an outer regulation surface formed in each of the connection members, wherein
the outer regulation surface abuts on an outer abutment surface of each of the nozzle members facing outward in the lateral direction when the nozzle members move away from each other in the lateral direction.

4. The attachment cleaning tool according to claim 1, wherein
the attachment comprises a cap that is attachable to and detachable from the connection members, and
the cap is not press-fitted into the tubular portion in the lateral direction and is press-fitted into the tubular portion in an orthogonal direction orthogonal to the lateral direction and the longitudinal direction.

5. An attachment cleaning tool, comprising:
a cleaning tool;
an attachment detachably attached to the cleaning tool; and
an inner regulation portion formed in each of the connection members, wherein
the cleaning tool comprises:
   cleaning bodies that clean connection end surfaces of ferrules of an optical connector;
   head members each that press the cleaning bodies against the connection end surfaces;
   nozzle members that:
      respectively accommodate the head members, and
      move closer to each other or away from each other in a lateral direction in which the nozzle members are arranged;
   a feeding mechanism that supplies and withdraws the cleaning bodies with respect to the head members; and
   an accommodating body which accommodates the feeding mechanism,
the attachment comprises connection members that move following a relative movement of the nozzle members in the lateral direction,
each of the connection members comprises:
   an attachment portion attached to a tip portion of each of the nozzle members; and
   a tubular portion that protrudes from the attachment portion in a longitudinal direction of the nozzle members and into which one of the ferrules is inserted, and
the inner regulation portion abuts on an inner abutment surface of each of the nozzle members facing inward in the lateral direction when the nozzle members move closer to each other in the lateral direction.

6. The attachment cleaning tool according to claim 5, wherein
the attachment comprises a cap that is attachable to and detachable from the connection members, and
the cap is not press-fitted into the tubular portion in the lateral direction and is press-fitted into the tubular portion in an orthogonal direction orthogonal to the lateral direction and the longitudinal direction.

7. An attachment cleaning tool, comprising:
a cleaning tool; and
an attachment detachably attached to the cleaning tool, wherein
the cleaning tool comprises:
   cleaning bodies that clean connection end surfaces of ferrules of an optical connector;
   head members each that press the cleaning bodies against the connection end surfaces;
   nozzle members that:
      respectively accommodate the head members, and
      move closer to each other or away from each other in a lateral direction in which the nozzle members are arranged;
   a feeding mechanism that supplies and withdraws the cleaning bodies with respect to the head members; and
   an accommodating body which accommodates the feeding mechanism,
the attachment comprises connection members that move following a relative movement of the nozzle members in the lateral direction,
each of the connection members comprises:
   an attachment portion attached to a tip portion of each of the nozzle members; and
   a tubular portion that protrudes from the attachment portion in a longitudinal direction of the nozzle members and into which one of the ferrules is inserted,
the connection members include a first connection member and a second connection member,
the second connection member comprises:
   a pair of locking pieces that protrudes in the lateral direction and is disposed at an interval in an orthogonal direction orthogonal to the lateral direction and the longitudinal direction; and
   a pair of locking portions that protrudes inward in the orthogonal direction from each of the pair of locking pieces, and
the first connection member comprises:
   a pair of groove portions on which the pair of locking pieces respectively slide; and
   a pair of locking protruding portions that are respectively locked to the pair of locking portions.

* * * * *